UNITED STATES PATENT OFFICE.

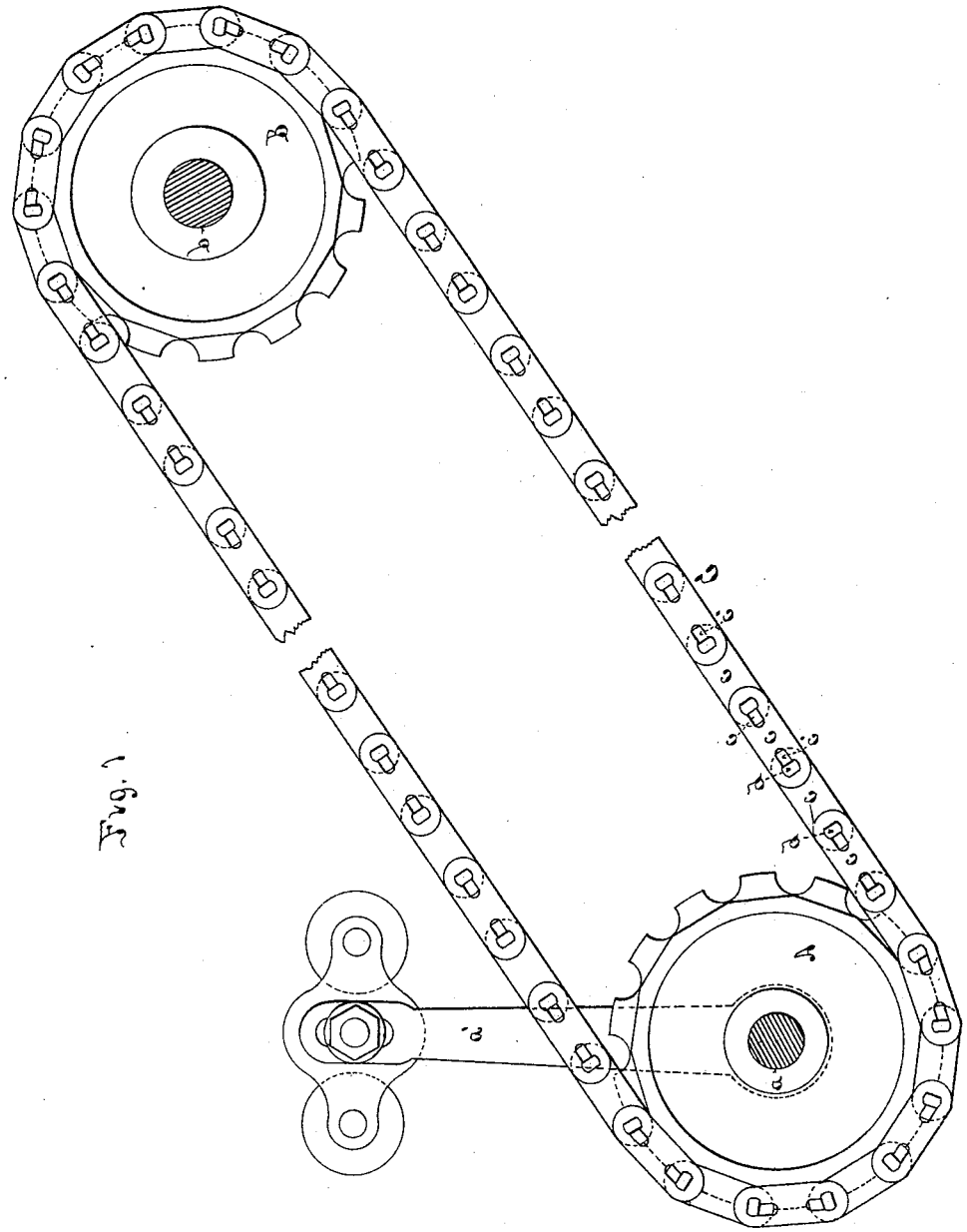

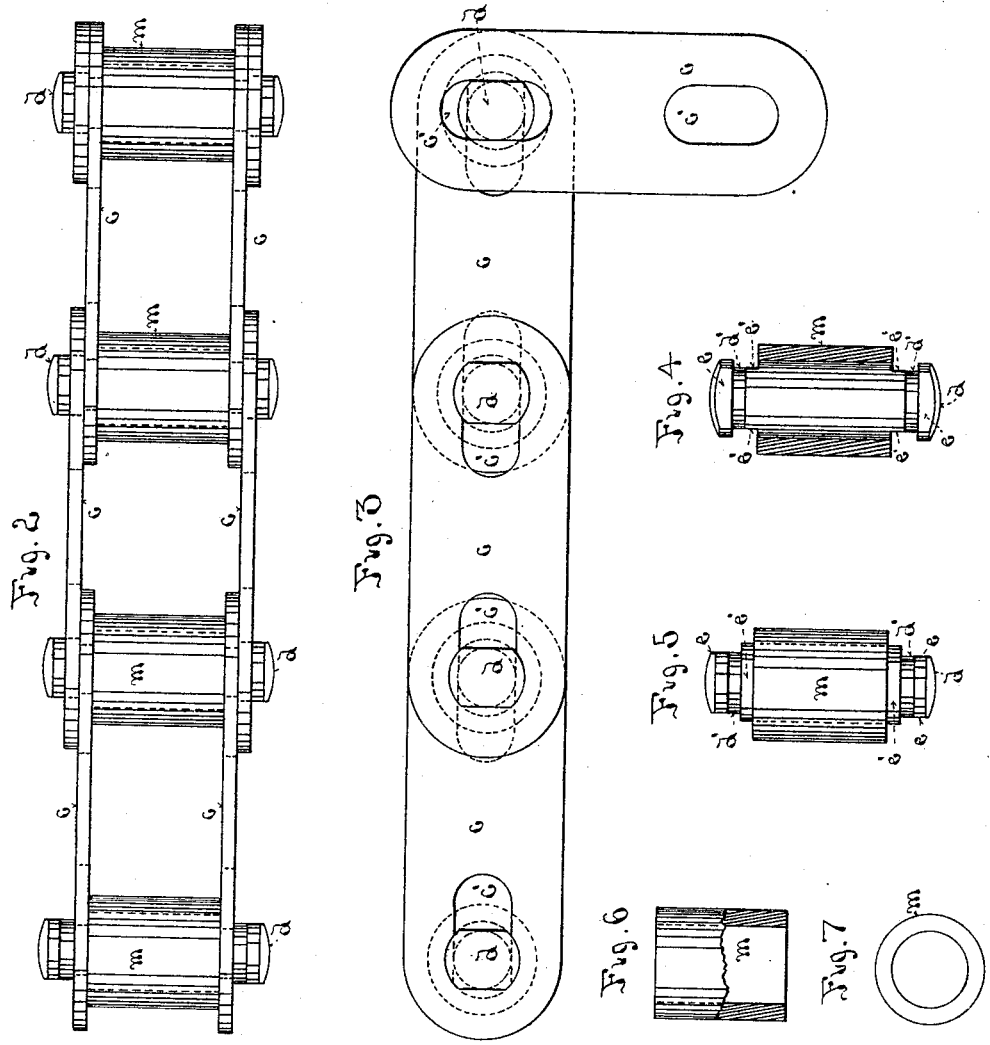

JOHN M. MARLIN, OF NEW HAVEN, CONNECTICUT.

CHAIN.

SPECIFICATION forming part of Letters Patent No. 371,607, dated October 18, 1887.

Application filed May 13, 1886. Serial No. 202,039. (Model.)

*To all whom it may concern:*

Be it known that I, JOHN M. MARLIN, of New Haven, in the county of New Haven and State of Connecticut, have invented a new and useful Improvement in Chains, of which the following is a specification.

My improvement relates to chains for driving sprocket-wheels; and it consists in certain new and useful formations of the bars and pivots forming the links and methods of joining the same together to construct the completed chain, substantially as hereinafter described and claimed.

In the drawings, Figure 1 is a side view of a pair of sprocket-wheels revolving on different axes and connected together by a chain constructed according to my invention. Fig. 2 is an enlarged view of a section of the chain upon its face, showing the open links. Fig. 3 is an edge view of Fig. 2. Fig. 4 is a side view of one of the pivots used in the chain, with its surrounding sleeve in section. Fig. 5 is a side view of the same, from a direction at right angles to that of Fig. 4, with the sleeve around it. Fig. 6 is a detached side view, partly in section, of said sleeve. Fig. 7 is an end view of the same.

A B are two sprocket-wheels mounted upon the shafts $a$ $b$, which revolve in suitable bearings—as, for instance, those of a bicycle or tricycle—in the usual manner. A crank-arm and pedal, $a'$, is used to drive wheel A. The endless chain C connects the wheels A B, passing around their peripheries, and receiving the sprockets or teeth of the wheels in its links, thus driving the wheel B positively from wheel A.

The chain is formed as follows: A series of short straps of sheet metal, $c$, about one sixteenth inch thick have elongated slots $c'$ made through them near each end, all the slots $c'$ being of equal length and situated in each pair of straps on opposite sides of the chain an equal distance apart. Pivots $d$ $d$ are formed with cylindrical bodies and have grooves $d'$ $d'$ of a width corresponding to the thickness of straps $c$ $c$ cut round their peripheries, forming heads on each end outside of the grooves. Each of these heads is flattened upon its opposite sides at $e$ $e$, Figs. 4 and 5, an amount which will bring these flattened surfaces tangential with the bottoms of grooves $d'$ $d'$. The diameter of the pivot at the bottoms of grooves $d'$ $d'$ is equal to the internal distance across slots $c'$ $c'$ in the straps $c$. On the surface of each pivot $d$, toward the center from grooves $d'$ $d'$, its sides are flattened off at $e'$ $e'$ to a distance equal to the thickness of straps $c$ $c$ and to the depth of the grooves $d'$ $d'$, such flattening $e'$ $e'$ being on the sides of the pivot at right angles to the flattening $e$ $e$ on the outer heads. The flattened sides $e$ $e$ and $e'$ $e'$ of the pivot which respectively come opposite to each other on the same end of the pivots are parallel. For each pivot $d$ there is provided a cylindrical sleeve, $m$, of a length just equal to the central cylindrical body part of the pivot. This sleeve is not necessary to the use of the chain, but is advantageous, as hereinafter described. It fits the body part of the pivot closely, but is capable of revolving thereon.

The several parts of the chain are put together as follows: Taking one of the pivots $d$, the cylindrical sleeve $m$ is slipped over it until it comes between the flattened faces $e'$ $e'$, as shown in Figs. 4 and 5. Next, one of the straps $c$ is turned so as to slip the slot $c'$ over the head of the pivot on one end, and another strap is slipped on in like manner, with the slots $c'$ $c'$ opposite those in the first strap, over the head on the other end. When these straps reach the grooves $d'$ $d'$, they are revolved one-quarter around in the same direction in the grooves $d'$ $d'$, so as to allow their slots $c'$ $c'$ upon the pivot to slip over the flattened surfaces $e'$ $e'$ on both ends. While in this position a second pivot is taken and turned so as to slip the slots in the free ends of the two straps over its heads on each end into its grooves $d'$ $d'$, and it is then revolved so as to slip the same two slots over its flattened faces $e'$ $e'$. A second pair of pivots is then inserted in a second pair of straps in the same manner. A third pair of straps is then taken and slipped over the heads of one of the pivots in each of the first two pairs of straps, so that said pivots shall lie in the slots $c'$ $c'$ at the ends of said third pair of straps, as shown in Figs. 2 and 3, when, by straightening the parts out, as shown in those figures, the straps and pivots will be found to have locked each other together in the form of a flexible chain, the links of which can only be separated by turning one link at right angles to its adjacent one. As in passing around the sprocket-gears A B the links of the chain are never at right angles to the adjacent ones, they can never come apart, the outermost straps on each pivot being always held upon it by the heads at each end, and the pivots being prevented from turning so as to bring the heads in position to pass through the slots of said outermost straps by the slots of the innermost straps fitting over their flattened faces $e'\ e'$. The sleeve $m$ lying between the innermost straps on each pivot turn upon the latter as it passes around the sprocket-gear A or B and prevent undue friction of the chain against the gears, while the straps on each side embrace the sprockets and turn the sprocket-wheel, or are carried around by it, as the case may be.

In case one of the straps $c$ or pivots $d$ breaks or is injured it is very quickly and readily replaced by another by taking the chain off the sprocket-gears and turning the links at right angles to each other and removing the injured portion and inserting another, as before described.

The chain is also very simple to manufacture as it contains but three parts not duplicates of each other—viz., the strap $c$, pivot $d$, and cylindrical sleeve $m$.

What I claim as new and of my invention is—

1. The combined chain for sprocket-gears, formed with open links, consisting of a series of straps, $c\ c$, provided with elongated slots $c'\ c'$ in each end, in combination with a series of pivots, $d\ d$, provided with flattened heads, grooves $d'\ d'$, and flat faces $e'\ e'$, substantially at right angles to the flattened faces upon said heads, all constructed and combined as and for the purposes described.

2. The combined chain for sprocket-gears, formed with open links, consisting of a series of straps, $c\ c$, provided with elongated slots $c'\ c'$ in each end, in combination with a series of pivots, $d\ d$, provided with flattened heads, grooves $d'\ d'$, and flat faces $e'\ e'$, substantially at right angles to the flattened faces upon said heads, and the tubular sleeves $m$, surrounding the body parts of the said pivots, all constructed and combined as and for the purposes described.

JOHN M. MARLIN.

Witnesses:
C. F. DEMMER,
W. H. KINNEY.